US010054266B2

United States Patent
Cogliati et al.

(10) Patent No.: US 10,054,266 B2
(45) Date of Patent: Aug. 21, 2018

(54) PRESSURE VESSEL WITH DOME SUPPORTED DIAPHRAGM

(71) Applicant: AMTROL Licensing Inc., West Warwick, RI (US)

(72) Inventors: Michael Cogliati, Warwick, RI (US); Christopher A. Van Haaren, Warwick, RI (US)

(73) Assignee: AMTROL Licensing Inc., West Warwick, RI (US)

( * ) Notice: Subject to any disclaimer, the term of this patent is extended or adjusted under 35 U.S.C. 154(b) by 172 days.

(21) Appl. No.: 15/065,371

(22) Filed: Mar. 9, 2016

(65) Prior Publication Data

US 2017/0261158 A1    Sep. 14, 2017

(51) Int. Cl.
| | |
|---|---|
| F15B 1/12 | (2006.01) |
| F17C 13/00 | (2006.01) |
| F17C 1/08 | (2006.01) |
| F17C 1/16 | (2006.01) |
| F16J 12/00 | (2006.01) |
| F24D 3/10 | (2006.01) |

(52) U.S. Cl.
CPC ............. *F17C 13/002* (2013.01); *F16J 12/00* (2013.01); *F17C 1/08* (2013.01); *F17C 1/16* (2013.01); *F24D 3/1016* (2013.01); *F15B 2201/3156* (2013.01); *F17C 2201/0128* (2013.01); *F17C 2203/012* (2013.01)

(58) Field of Classification Search
CPC . F16J 12/00; F24D 3/1016; F15B 2201/3156; F17C 13/002; F17C 1/08; F17C 1/16; F17C 2201/0128; F17C 2203/012

USPC ...... 220/581, 720, 721, 723, 584, 4.21, 530; 62/47.1, 53.1
See application file for complete search history.

(56) References Cited

U.S. PATENT DOCUMENTS

| | | | |
|---|---|---|---|
| 5,386,925 A | 2/1995 | Lane | |
| 5,806,705 A | 9/1998 | Herald, Jr. et al. | |
| 7,216,673 B2 | 5/2007 | Gremour et al. | |

FOREIGN PATENT DOCUMENTS

| | | | | |
|---|---|---|---|---|
| EP | 0790411 | * | 8/1997 | ............... F17C 1/16 |
| EP | 0790411 A1 | | 8/1997 | |
| EP | 0844400 A2 | | 5/1998 | |
| WO | WO-2013/034508 A2 | | 3/2013 | |
| WO | WO2013034508 | * | 3/2013 | ............... F17C 1/16 |

OTHER PUBLICATIONS

Extended European Search Report dated Jul. 14, 2017 issued during the prosecution of corresponding European Patent Application No. EP 17154946.2 (8 pages).

* cited by examiner

*Primary Examiner* — J. Gregory Pickett
*Assistant Examiner* — Elizabeth Volz
(74) *Attorney, Agent, or Firm* — Tucker Ellis LLP; Carlos Garritano

(57) ABSTRACT

A non-metallic pressure vessel is disclosed that includes a bottom dome having an upper wall defining an interface channel, a top dome having a lower wall defining a downwardly projecting securement flange dimensioned and aligned for vertical engagement within the interface channel of the bottom dome, and a flexible diaphragm retained within the interface channel of the bottom dome by the downwardly projecting flange of the upper dome.

18 Claims, 4 Drawing Sheets

PRESSURE VESSEL WITH DOME SUPPORTED DIAPHRAGM

BACKGROUND OF THE INVENTION

1. Field of the Invention

The present invention relates to water systems, e.g., closed hot water heating systems, pressurized water systems, and the like, that include expansion tanks or well tanks and, more particularly, to water systems including non-metallic expansion tanks with an internal diaphragm that separates a pressurized air chamber from a water storage chamber.

2. Description of Related Art

Water systems that provide and distribute well water domestically in rural parts of the country typically include a pump to draw water from the well; pipes or other conduits through which water travels; and a tank for storing water, e.g., a well tank. Well tanks, for example, expansion tanks, are structured and arranged to store water until demanded and to accommodate internal pressures of the system. To this end, well tanks typically provide an air cushion for the supply water.

Generally, the water chamber in the interior of the tank assembly that stores water is in fluid communication with the pipes or conduits of the domestic water system. By design, the water chamber is structured and arranged to provide an operating pressure, e.g., about 20 to 40 pounds per square inch ("psi"), to the water system. To accomplish this, the compressible gas chamber contains a pressurized gas, e.g., nitrogen or, more preferably, air, that can force water through the water system and that, further, can prevent creation of negative or back pressures in the water system during the cyclical demand for water and/or volume changes associated with the change in water temperature. If the pressure in the water chamber falls below the operating pressure, the pump is activated and water is added to the water chamber of the expansion tank until the water chamber again provides the operating pressure.

In any closed system containing air and water that undergoes natural or artificial temperature changes, the likelihood of problems stemming from interaction of air and water is great. Air is soluble in water and water readily absorbs air. Indeed, the amount of absorbed air in water is inversely proportional to the water temperature. Thus, as water is heated, e.g., in connection with a closed hot water heating system, the air in the water is liberated into the system and as heated water cools, the cooling heated water in direct contact with air, e.g., in the compression tank, absorbs some of the free air. By its very nature and through thermal circulation, air-charged water that is cyclically heated and cooled changes continually so that during the next heating cycle the re-absorbed air is again liberated into the system. This cyclical and reversible process is repeated as often as the heating, or firing, cycle is repeated and the boiler water is heated and cooled. This poses many problems to designers.

First, air released by heated water, typically, accumulates in the compression tank and other portions of the heating system. This accumulation results in reduced heating efficiency. This makes continuous venting of radiators or convectors to bleed off the air necessary. Moreover, as water is heated, it can expand into the compression tank that is connected to the pipes and other conduits. Typically, in the compression tank, the expanding, heated water is in intimate communication with the released air and any other air in the tank. However, when the heated water reaches a desired temperature, the firing of the boiler ceases and the water begins to cool and contract. As the water cools, it re-adsorbs free air in the compression tank.

Second, when a tank includes an air cushion, the cooling water may absorb all or substantially all of the air cushion, leaving a static water system. Without an air cushion, or, more specifically, air pressure to force water through the system, a pressure pump may be needed constantly. Optionally, an air surge chamber can be provided that is not in direct contact with the water, thereby eliminating the need of the pressure pump operating every time a faucet was turned on. Pressure pumps and surge chambers increase the cost of a water system.

To address these shortcomings, conventional expansion and well tanks (collectively "tank assemblies") typically include impermeable diaphragms, or bladders, to separate the interior of the well tank into two chambers, or cells: a liquid, or water, chamber and a compressible, or pressurized, gas chamber. As water is pumped from a well into the tank assembly, the volume of water in the water chamber increases. This causes the diaphragm to contract the volume of the pressurized gas chamber.

As the volume of the pressurized gas chamber decreases, the gas pressure in the pressurized gas chamber increases. Consequently, when water for the tank is demanded by the water system, the gas in the pressurized gas chamber forces the water into the water system. As a result, the volume of water in the water chamber decreases, the volume of the pressurized gas chamber increases, and thus the pressure of the pressurized gas decreases.

Conventional diaphragms are constructed of a non-porous, elastic material, e.g., plastic or butyl rubber, and are sealed at the periphery or sidewall of the tank to provide an air- and watertight seal. Not only does the use of a diaphragm avoid the above-described air-water problems, but, also, separation of water from the pressurized gas is desirable because water in the presence of oxygen produces oxidation that can damage metal or other portions of the system and, furthermore, can aerate the water, which can affect water quality.

An example of a conventional tank assembly is provided in U.S. Pat. No. 5,386,925 to Lane. The Lane patent provides an expansion tank comprising a deformable diaphragm that divides the tank into two sections. The diaphragm separates the gas in the one section of the tank from the water in the other section of the tank and the rest of the system. The gas section is pre-charged with gas under pressure so that the diaphragm is displaced to increase or decrease the volume of this section according to the variations of the volume of water in the other section.

The Lane expansion tank system includes two sections that are made of metal, which requires assembly with, i.e., welding to, a metal clamp ring that is disposed inside of the two tank portions. This assembly is relatively expensive and labor and time intensive to manufacture. Moreover, steel tanks can corrode from external environmental exposure, which can lead to deterioration of the tank assembly and the water system. Such deterioration can lead to catastrophic results, such as leaking tanks.

To provide some protection from corrosion, the inner surface of the liquid chamber portion of the metal expansion tank is covered by a water, or liquid impervious liner. This, however, requires fabricating the liner in a separate operation and then inserting the liner in the liquid chamber portion.

Therefore, it would be desirable to provide a non-metallic tank assembly that does not affect the quality or taste of the water or that does not deteriorate over time in a corrosive environment. It would also be desirable to provide a non-metallic tank assembly with an internal diaphragm interposed between the water chamber and the gas chamber to separate the water from pressurized gas. Furthermore, it would be desirable to provide a non-metallic, diaphragm-type tank assembly that can withstand the internal pressures normally associated with tank assemblies. Finally, it would be desirable to provide a lighter, non-metallic alternative to conventional metallic tank assemblies and to provide such a tank at lower cost.

SUMMARY OF THE INVENTION

The subject invention is directed to a new and useful non-metallic pressure vessel that includes a bottom dome having an upper wall defining an interface channel, a top dome having a lower wall defining a downwardly projecting securement flange dimensioned and aligned for vertical engagement within the interface channel of the bottom dome, and a flexible diaphragm retained within the interface channel of the bottom dome by the downwardly projecting flange of the upper dome. Preferably, the pressure vessel is designed for use with a pressurized water system and the flexible diaphragm is adapted and configured to separate the interior of the pressure vessel into a pressurized gas region and a refillable water storage region.

The upper wall of the bottom dome defines a stepped interface channel located between a radially offset inner wall portion and a radially outer wall portion. The lower wall of the top dome is radially outward of the downwardly projecting flange and defines a horizontal abutment surface which abuts with the radially outer wall portion of the bottom dome. The lower wall of the upper dome and the radially outer wall portion of the bottom dome form a horizontal belt that surrounds the pressure vessel.

The stepped interface channel includes a radially inner top step and a radially outer bottom step separated by a riser. A pressurization port is formed in a side location of the top dome, and a fluid flow port is formed at a bottom dead center location of the bottom dome. The bottom dome includes a plurality of circumferentially spaced apart integral ribs providing structural support for the bottom dome. The circumferentially spaced apart integral ribs are configured to form a support stand for the pressure vessel when it is in a vertical orientation. It is envisioned hat the spaced apart integral ribs can also be configured and arranged to form a support stand for the pressure vessel when it is in a horizontal orientation.

The subject invention is also directed to a plastic pressure vessel for use with a pressurized water system that includes a bottom dome having an upper wall defining a stepped interface channel located between a radially offset inner wall portion and a radially outer wall portion, a top dome having a lower wall defining a downwardly projecting securement flange dimensioned and aligned for vertical engagement within the stepped channel of the bottom dome, and a flexible diaphragm having an outer periphery retained within the stepped channel of the bottom dome by the downwardly projecting flange of the upper dome for separating the interior of the pressure vessel into a pressurized gas region and a refillable water storage region.

These and other features of the subject invention and the manner in which it is manufactured and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the pressure vessel of the subject invention appertains will readily understand how to make and use the subject invention without undue experimentation, preferred embodiments thereof will be described in detail herein below with reference to certain figures, wherein.

DETAILED DESCRIPTION OF PREFERRED EMBODIMENTS

Figure 1:
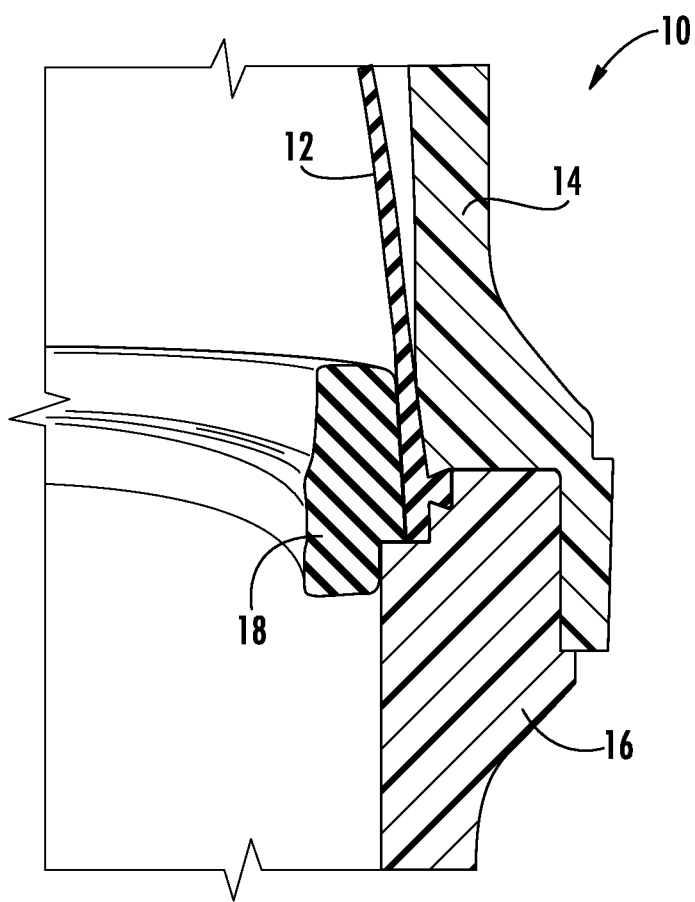
FIG. 1 is a cross-sectional view of the interface region of a prior art pressure vessel in which the diaphragm is trapped between the top and bottom domes and an inner ring component, wherein the diaphragm is held in place before the top and bottom domes are welded together.

Referring initially to FIG. 1, there is illustrated a cross-sectional view of the mechanical interface region of a prior art plastic pressure vessel 10 in which the outer periphery of a flexible diaphragm 12 is partially trapped between the top dome 14 and bottom dome 16 of the pressure vessel 10. The interface of the two domes 14, 16 forms a pressure seal to create an air side and a water side of the pressure vessel, and hold the outer periphery of the diaphragm in place under operating conditions.

The diaphragm 12 is further secured in place by an inner ring component 18, which compresses the diaphragm 12 against the inner surface of the pressure vessel 10 during assembly. Moreover, the ring component 18 holds the diaphragm 12 in place before the top and bottom domes 14, 16 are joined together in a hot plate welding process. The inner ring component 18 is at least partially consumed during the welding process, to form a secure pressure seal.

While the prior art interface design of FIG. 1 meets the requirement of holding the diaphragm 12 in place under operating pressure, the use of an additional ring component 18 to construct the interface adds complexity to the hot plate welding process from an engineering standpoint, because it must hold the diaphragm 12 in place in a blind manner inside the pressure vessel. In addition, because the inner ring component 18 is at least partially consumed in the hot plate welding process in a blind manner inside the vessel, quality control and inspection of the weld is virtually impossible. Furthermore, the inner ring component 18 increases the overall cost of the system, which is commercially undesirable.

Figure 2:
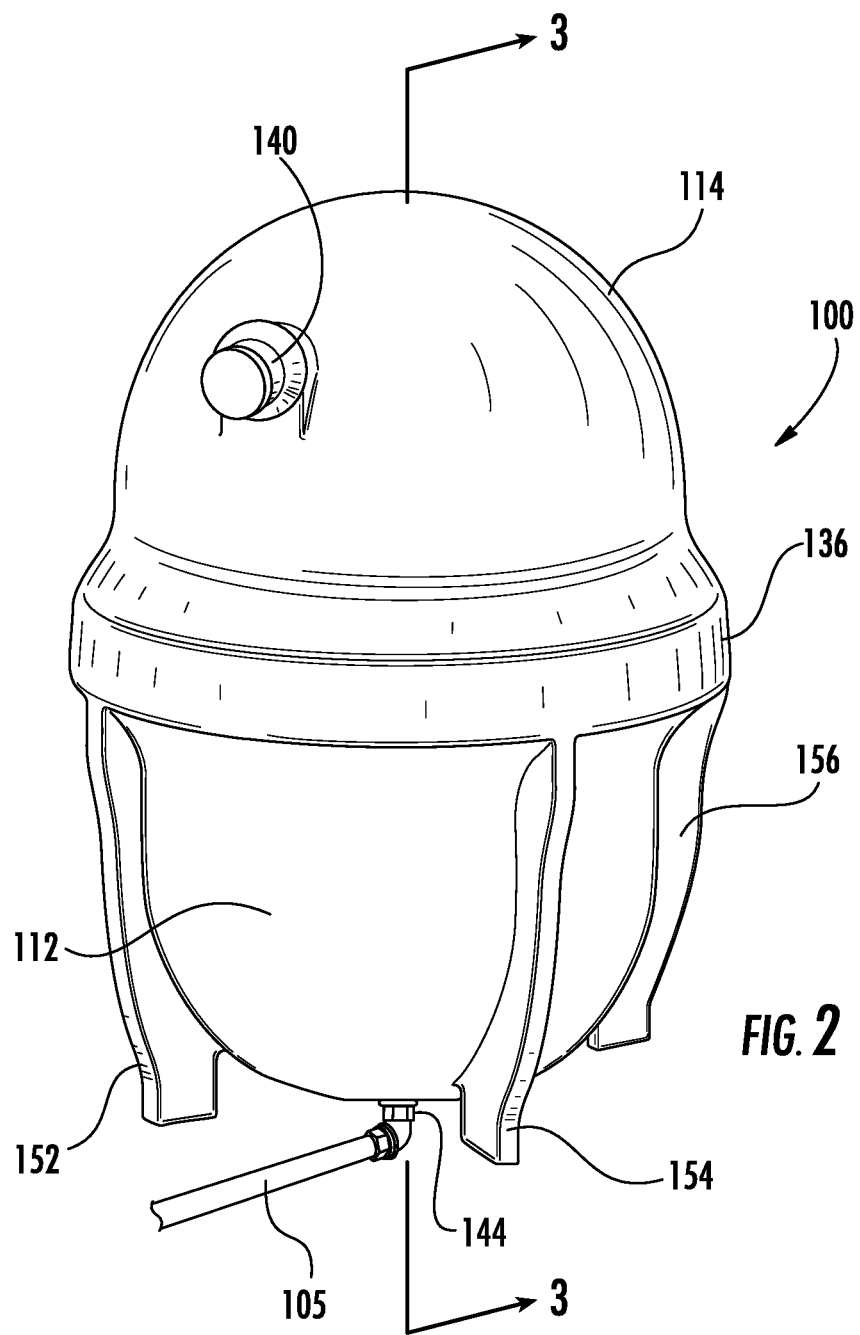
FIG. 2 is a perspective view of the pressure vessel of the subject invention.

Referring now to the remaining drawings, wherein like reference numerals identify similar structural features or aspects of the subject invention, there is illustrated in FIG. 2 a non-metallic (e.g., plastic) pressure vessel constructed in accordance with a preferred embodiment of the subject invention and designated generally by reference numeral 100. Pressure vessel 100 is connected to a water supply system 105. As explained in detail below, the pressure vessel 100 includes water chamber and a gas chamber separated from one another by a flexible diaphragm which is preferably constructed of a non-porous, elastic material, such as plastic or butyl rubber.

In use, as water is pumped into the pressure vessel 100 from a well, the volume of the water in the water chamber increases, which causes the diaphragm to contract the volume of the pressurized gas chamber. Conversely, as the volume of the pressurized gas chamber decreases, the gas pressure in the pressurized gas chamber increases. Consequently, when water for the pressure vessel 100 is demanded by the water system 105, the gas in the pressurized gas chamber forces the water into the water system 105. As a result, the volume of water in the water chamber decreases, and the volume of the pressurized gas chamber increases.

Figure 3:
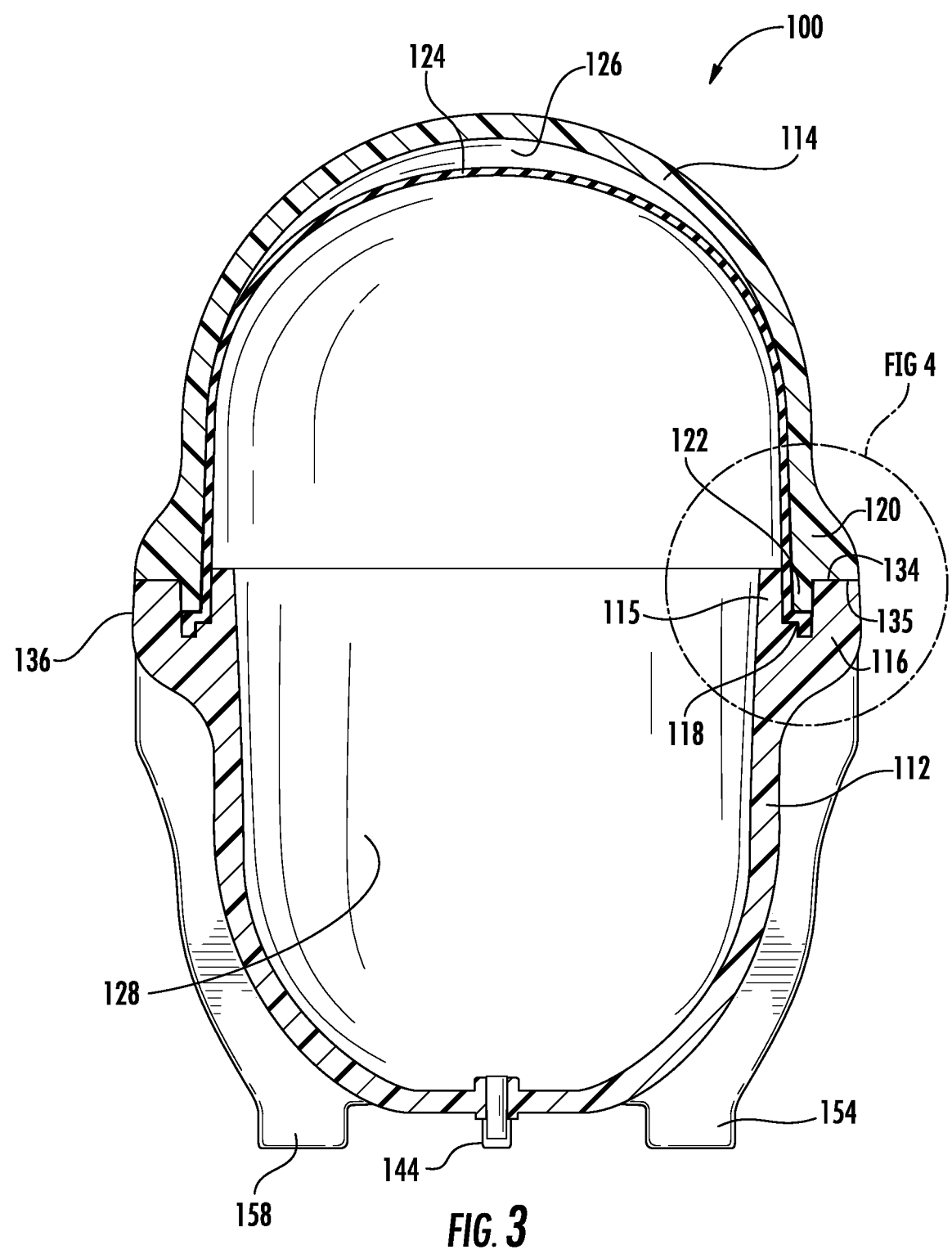
FIG. 3 is a vertical cross-sectional view of the pressure vessel of FIG. 2.
Figure 4:
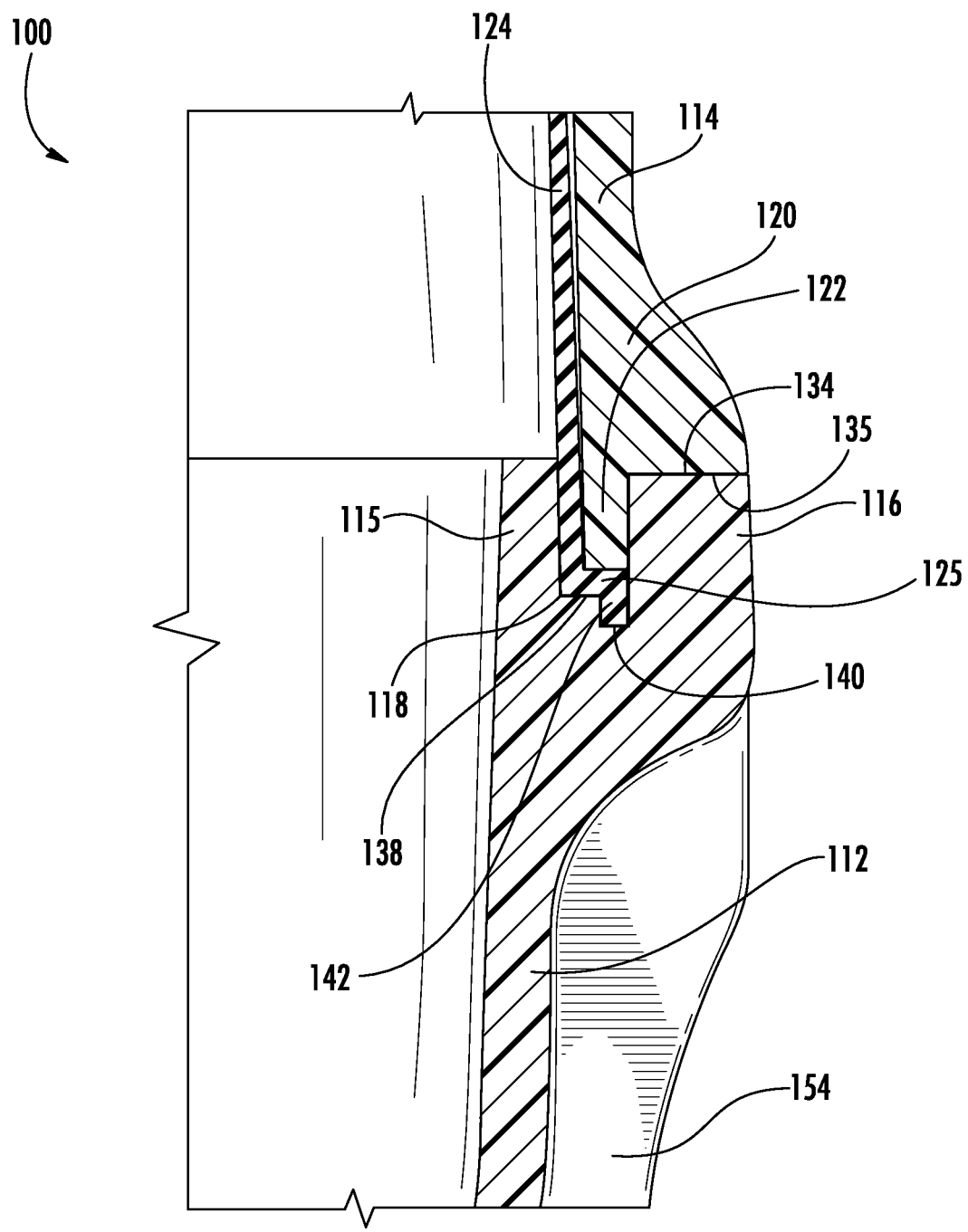
FIG. 4 is an enlarged localized cross-sectional view of the interface between the top dome and the bottom dome of the pressure vessel of FIGS. 2 and 3.

Referring now to FIG. 3, non-metallic pressure vessel 100 includes a bottom dome 112 and a top dome 114, which are both made from a high strength, light weight plastic material, such polyester, polypropylene or the like. As best seen in FIG. 4, a mechanical interface is formed between the two domes 112, 114 to form a pressure seal for a flexible diaphragm 124. The bottom dome 112 has a radially inner offset upper wall 115 and a radially outer upper wall 116. An annular stepped interface channel 118 is defined between the radially inner offset upper wall 115 and the radially outer upper wall 116. The stepped interface channel 118 includes a radially inner horizontal top step 138 and a radially outer horizontal bottom step 140 separated by a vertical riser 142.

The top dome 114 has a lower wall 120 defining a downwardly projecting radially inwardly offset annular securement flange 122. The securement flange 122 is dimensioned and configured for vertical alignment and engagement within the stepped interface channel 118 of the bottom dome 112. As best seen in FIG. 4, the outer periphery 125 of the flexible diaphragm 124 is captured and securely retained within the stepped interface channel 118 of the bottom dome 112 by the downwardly projecting flange 122 of the top dome 114. More particularly, the outer periphery of the diaphragm 124 is substantially captured between the offset upper wall 115 and the securement flange 122.

With continuing reference to FIG. 4, the lower wall 120 of the top dome 114 is radially outward of the downwardly projecting flange 122 and it defines a horizontal abutment surface 134 which abuts with the top surface 135 of the radially outer wall portion 116 of the bottom dome 112. These abutment surfaces 134, 135 form the weld joint between the two domes 112, 114. The lower wall 120 of the top dome 114 and the radially outer wall portion 116 of the bottom dome 112 form an outwardly projecting belt 136 that surrounds the entire periphery pressure vessel 100, as best seen in FIG. 2.

As best seen in FIG. 3, the flexible diaphragm 124 is adapted and configured to separate the interior of the pressure vessel 100 into a pressurized gas chamber 126 and a refillable water storage chamber 128. The pressurized gas chamber 126 is defined between the top dome 114 and the diaphragm 124, while the water chamber 128 is defined between the bottom dome 112 and the diaphragm 124. A fluid flow port 144 is formed at a bottom dead center location of the bottom dome 112 for connecting the water storage chamber 128 with the water supply system 105.

A pressurization port 140 shown in FIG. 2 is formed in a side location of the top dome 114 for connection with a source of pressurized gas used for pre-charging the pressurized gas chamber 126, so that the diaphragm 124 is displaced to increase or decrease the volume of the gas chamber 126 according to variations of the volume of water in the water storage chamber 128. By design, the water chamber 128 is structured and arranged to provide an operating pressure of about 20 to 40 psi to the water system 105. To accomplish this, the gas chamber 126 contains a pressurized gas, such as for example, nitrogen or air.

The bottom dome 112 includes a set of four spaced apart integral ribs 152, 154, 156 and 158, providing structural support for the bottom dome 112, which are seen in FIGS. 2 and 3. The spaced apart integral ribs 152-158 are generally rectangular in cross-section and are configured to form a support stand for the pressure vessel 100 when it is in a vertical upright orientation, as shown in FIGS. 2 and 3. It is envisioned that the spaced apart integral ribs 152-158 can also be positioned relative to one another to form a support stand for the pressure vessel when it is in a horizontal orientation. In this regard, the ribs may be spaced equidistant from one another about the circumference of the pressure vessel or they may be spaced apart from one another in a different pattern. It is also envisioned that fewer than four ribs can be provided, or more than four ribs can be provided, deposing upon the application.

Those skilled in the art will readily appreciate that the design of the stepped interface 118 formed by the two plastic domes 112, 114 shown in FIGS. 3 and 4 eliminates the need for an inner support ring, such as that which is required in the prior art design shown in FIG. 1. This is accomplished through the unique configuration of the radially offset walls of the domes. This offset structure creates the support for the diaphragm 124 that is provided in the prior art design by the inner support ring 18. Moreover, when using the inner support ring 18, the walls of the two domes 14, 16 must be aligned, whereas without an inner support ring, the walls of the domes 112, 114 are offset, which provides several advantages over the prior art, as explained further below.

In the prior art pressure vessel 10 shown in FIG. 1, the top and bottom domes 14, 16 have a substantially equal outer diameter. In contrast, in the pressure vessel 100 of the subject invention shown in FIGS. 3 and 4, the offset walls of the domes 112, 114 create an outside geometry or shape where the diameter of the bottom dome 112 differs from that of the top dome 114. Moreover, because of the interface configuration, the outer diameter of the bottom dome 112 is greater than the outer diameter of the upper dome 114. This provides an opportunity for using the ribs 152-158 to add structural geometry and rigidity to the bottom dome 112 of the vessel 100.

This geometry helps the eye to keep the alignment of the top dome 114 and the bottom dome 112 during the manufacturing process, and provides a way for the person welding the domes together to hold the bottom dome 112 so that it maintains position without rotation during assembly. It also helps to create additional structure for the bottom dome 112, so that the top dome 114 can be designed with thinner walls.

While the non-metallic pressure subject invention has been shown and described with reference to preferred embodiments, those skilled in the art will readily appreciate that various changes and/or modifications may be made thereto without departing from the spirit and scope of the subject invention as defined by the appended claims.

What is claimed is:
1. A non-metallic pressure vessel comprising:
   a) a bottom dome having an upper wall defining an interface channel;
   b) a top dome having a lower wall defining a downwardly projecting securement flange dimensioned and aligned for vertical engagement within the interface channel of the bottom dome, wherein the securement flange includes a vertical securement surface and a horizontal securement surface; and c) a flexible diaphragm sealingly retained within the interface channel of the bottom dome by the downwardly projecting securement flange of the top dome, wherein the flexible diaphragm is retained within the interface channel by the vertical securement surface of the securement flange and the horizontal securement surface of the securement flange.

2. A non-metallic pressure vessel as recited in claim 1, wherein the flexible diaphragm is adapted and configured to separate the interior of the pressure vessel into a pressurized gas region and a refillable water storage region.

3. A non-metallic pressure vessel as recited in claim 1, wherein the upper wall of the bottom dome defines a stepped interface channel located between a radially offset inner wall portion and a radially outer wall portion.

4. A non-metallic pressure vessel as recited in claim 3, wherein the lower wall of the top dome is radially outward of the downwardly projecting flange and defines a horizontal abutment surface which abuts with the radially outer wall portion of the bottom dome.

5. A non-metallic pressure vessel as recited in claim 3, wherein the lower wall of the upper dome and the radially outer wall portion of the bottom dome form a horizontal belt that surrounds the pressure vessel.

6. A non-metallic pressure vessel as recited in claim 3, wherein the stepped interface channel includes a radially inner top step and a radially outer bottom step separated by a riser.

7. A non-metallic pressure vessel as recited in claim 1, wherein a pressurization port is formed in a side location of the top dome.

8. A non-metallic pressure vessel as recited in claim 1, wherein a fluid flow port is formed at a bottom dead center location of the bottom dome.

9. A non-metallic pressure vessel as recited in claim 1, wherein the bottom dome includes a plurality of circumferentially spaced apart integral ribs providing structural support for the bottom dome.

10. A non-metallic pressure vessel as recited in claim 9, wherein the plurality of circumferentially spaced apart integral ribs form a support stand for the pressure vessel.

11. A plastic pressure vessel for use with a pressurized water system comprising:

a) a bottom dome having an upper wall defining a stepped annular interface channel located between a radially offset inner wall portion and a radially outer wall portion;

b) a top dome having a lower wall defining a downwardly projecting annular securement flange dimensioned and aligned for vertical engagement within the stepped channel of the bottom dome, wherein the annular securement flange includes a vertical securement surface and a horizontal securement surface; and c) a flexible diaphragm having an outer periphery retained within the stepped channel of the bottom dome by the downwardly projecting securement flange of the top dome for separating the interior of the pressure vessel into a pressurized gas region and a refillable water storage region, wherein the flexible diaphragm is retained within the interface channel by the vertical securement surface of the annular securement flange and the horizontal securement surface of the annular securement flange.

12. A plastic pressure vessel as recited in claim 11, wherein the lower wall of the top dome is radially outward of the downwardly projecting flange and defines a horizontal abutment surface which abuts with the radially outer wall portion of the bottom dome.

13. A plastic pressure vessel as recited in claim 11, wherein the lower wall of the top dome and the radially outer wall portion of the bottom dome form a horizontal belt that surrounds the pressure vessel.

14. A plastic pressure vessel as recited in claim 11, wherein the stepped interface channel includes a radially inner top step and a radially outer bottom step separated by a riser.

15. A plastic pressure vessel as recited in claim 11, wherein a pressurization port is formed in a side location of the top dome.

16. A plastic pressure vessel as recited in claim 11, wherein a fluid flow port is formed at a bottom dead center location of the bottom dome.

17. A plastic pressure vessel as recited in claim 11, wherein the bottom dome includes a plurality of circumferentially spaced apart ribs providing structural support for the bottom dome.

18. A plastic pressure vessel as recited in claim 17, wherein the plurality of circumferentially spaced apart ribs form a support stand for the pressure vessel.

* * * * *